United States Patent
Trommelen

(10) Patent No.: US 6,813,487 B1
(45) Date of Patent: Nov. 2, 2004

(54) METHOD AND APPARATUS FOR SECURING DATA STORED IN A REMOTE ELECTRONIC DEVICE

(76) Inventor: David Alan Trommelen, 142 Woodlake Dr., Marlton, NJ (US) 08053

(*) Notice: Subject to any disclaimer, the term of this patent is extended or adjusted under 35 U.S.C. 154(b) by 415 days.

(21) Appl. No.: 09/690,977

(22) Filed: Oct. 18, 2000

(51) Int. Cl.[7] .......................... H04Q 7/20; H04Q 7/22; H04Q 7/32
(52) U.S. Cl. ........................ 455/404.1; 455/404.2; 455/456.1; 455/456.5; 340/568.1; 340/571
(58) Field of Search ................ 455/410, 411, 455/403, 422, 517, 404, 456, 457, 521, 456.1, 456.2, 456.3, 456.4, 456.5, 456.6, 404.1, 404.2, 414.1, 414.2; 340/568, 568.1, 568.2, 571

(56) References Cited

U.S. PATENT DOCUMENTS

| | | |
|---|---|---|
| 5,023,873 A | 6/1991 | Stevenson et al. |
| 5,223,844 A | 6/1993 | Mansell et al. |
| 5,307,354 A | 4/1994 | Cramer et al. |
| 5,365,451 A | 11/1994 | Wang et al. |
| 5,515,043 A | 5/1996 | Berard et al. |
| 5,566,236 A | 10/1996 | MeLampy et al. |
| 5,576,716 A | 11/1996 | Sadler |
| 5,587,715 A | 12/1996 | Lewis |
| 5,592,175 A | 1/1997 | Tayloe |
| 5,603,054 A | 2/1997 | Theimer et al. |
| 5,606,325 A | 2/1997 | Masudaya |
| 5,617,100 A | 4/1997 | Akiyoshi et al. |
| 5,652,570 A | 7/1997 | Lepkofker |
| 5,652,908 A | 7/1997 | Douglas et al. |
| 5,673,305 A | 9/1997 | Ross |
| 5,703,598 A | 12/1997 | Emmons |
| 5,712,899 A | 1/1998 | Pace, II |
| 5,731,785 A | 3/1998 | Lemelson et al. |
| 5,734,978 A * | 3/1998 | Hayatake et al. ........... 455/410 |
| 5,748,084 A | 5/1998 | Isikoff |
| 5,752,218 A | 5/1998 | Harrison et al. |
| 5,757,916 A | 5/1998 | MacDoran et al. |
| 5,905,461 A | 5/1999 | Neher |
| 5,986,543 A | 11/1999 | Johnson |
| 6,069,570 A | 5/2000 | Herring |
| 6,091,957 A | 7/2000 | Larkins et al. |
| 6,105,138 A | 8/2000 | Arakawa et al. |
| 6,397,088 B1 * | 5/2002 | Roo ........................... 455/410 |

FOREIGN PATENT DOCUMENTS

| | | |
|---|---|---|
| EP | 0836131 | 4/1998 |
| WO | 9522131 | 8/1995 |

* cited by examiner

*Primary Examiner*—William Trost
*Assistant Examiner*—Keith Ferguson
(74) *Attorney, Agent, or Firm*—Morgan, Lewis & Bockius LLP

(57) ABSTRACT

A method and apparatus for protecting data in a remote electronic device serviced by a network provider and used by a subscriber. Initially, a communication from the subscriber indicating loss of the remote electronic device by the subscriber is received at a site operated by the network provider. Next, an attempt is made, from the site operated by the network provider, to contact the remote electronic device via a wireless link. If the initial attempt to contact the remote electronic device is unsuccessful, further attempts are then made at regular intervals from the site operated by the network provider to contact the remote electronic device via the wireless link, until contact is made between the site operated by the network provider and the remote electronic device. After contact is made with the remote electronic device from the site operated by the network provider, the site operated by the network provider transmits at least one data recovery signal to the remote electronic device. The at least one data recovery signal disables normal operation of the remote electronic device and deletes, downloads or places in safe mode at least one file stored in the remote electronic device.

2 Claims, 4 Drawing Sheets

METHOD AND APPARATUS FOR SECURING DATA STORED IN A REMOTE ELECTRONIC DEVICE

FIELD OF THE INVENTION

The present invention is directed to remote electronic devices that store information that is valuable to the user of the device including for example wireless telephones, pagers, palm pilots, or laptop computers, music/video players, cameras, and or any devices capable of storing data.

BACKGROUND OF THE INVENTION

Users of remote electronic devices such as wireless telephones, pagers, palm pilots or laptops, etc. typically store a vast array of confidential information on such devices. In many cases, information relevant to a user's personal or business affairs, such as phone numbers and addresses of associates, account information, business information, alarm codes computer passwords, appointments, email messages, confidential correspondence, and confidential documents, are stored in the memories of such devices. When such a device is lost by the user, or the device is stolen from the user by a third-party, the information stored in the device is vulnerable. A need therefore exists for a system that safeguards or protects information stored in remote electronic devices when such devices are lost or stolen.

This, and other objects of the invention, will become apparent from the description which follows.

SUMMARY OF THE INVENTION

The present invention is directed to a method and apparatus for protecting data in a remote electronic device serviced by a network provider and used by a subscriber of the network provider. Initially, a communication from the subscriber indicating loss of the remote electronic device by the subscriber is received at a site operated by the network provider. Next, an attempt is made, from the site operated by the network provider, to contact the remote electronic device via a wireless link. If the initial attempt to contact the remote electronic device is unsuccessful, further attempts are then made at regular intervals from the site operated by the network provider to contact the remote electronic device via the wireless link, until contact is made between the site operated by the network provider and the remote electronic device. After contact is made with the remote electronic device from the site operated by the network provider, the site operated by the network provider transmits at least one data recovery signal to the remote electronic device. The at least one data recovery signal disables normal operation by initiating safe made which terminates the ability to shut power off and/or use of the remote electronic device.

In a particularly preferred embodiment, the data recovery signal causes the stored data files to be transferred to the site of the network provider and downloaded to their systems.

In another embodiment, further recovery signals sent from the site operated by the network provider are used to activate an audio alarm signal to be emitted from the remote electronic device. The alarm signal may be optionally a voice message stating the unauthorized possession of the electronic device, requesting assistance and providing return instructions.

In a further preferred embodiment, after contact is made with the remote electronic device from the site operated by the network provider, at least one data recovery signal or optionally a further recovery signal to delete stored data from the device is sent from the network provider.

In a still further embodiment, the data recovery signal causes the remote electronic device to be disabled by terminating power.

In accordance with a further aspect, the present invention also determines, at the site of the network provider, a geographic location of the remote electronic device upon making contact with the remote electronic device. The geographic information can optionally be determined from triangulation of signals received from the remote electronic device or, alternatively, the geographic information may be determined at the remote electronic device using, for example, a GPS receiver, and then downloaded to the site of the network provider. In either case, after the site operated by the network provider determines the geographic location of the remote electronic device, information representing a geographic position of the remote electronic device is conveyed from the site operated by the network provider to the subscriber. Next, the subscriber determines whether the device is lost or stolen based on the conveyed geographic information, and the subscriber thereafter provides an indication as to whether the remote electronic device is either lost or stolen to the site operated by the network provider. If the subscriber indicates that the remote electronic device is lost, then an attempt to recover the remote electronic device is made prior to transmitting the at least one data recovery signal to the remote electronic device. Alternatively, if the subscriber indicates that the remote electronic device is stolen, then the at least one data recovery signal is immediately transmitted to the remote electronic device upon receipt of the indication from the subscriber that the remote electronic device is stolen.

BRIEF DESCRIPTION OF THE DRAWINGS

In order that the manner in which the above-recited and other advantages and objects of the invention are obtained can be appreciated, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention and the presently understood best mode thereof will be described and explained with additional specificity and detail through the use of the accompanying drawings in which.

DETAILED DESCRIPTION OF THE PREFERRED EMBODIMENTS

Figure 1A:
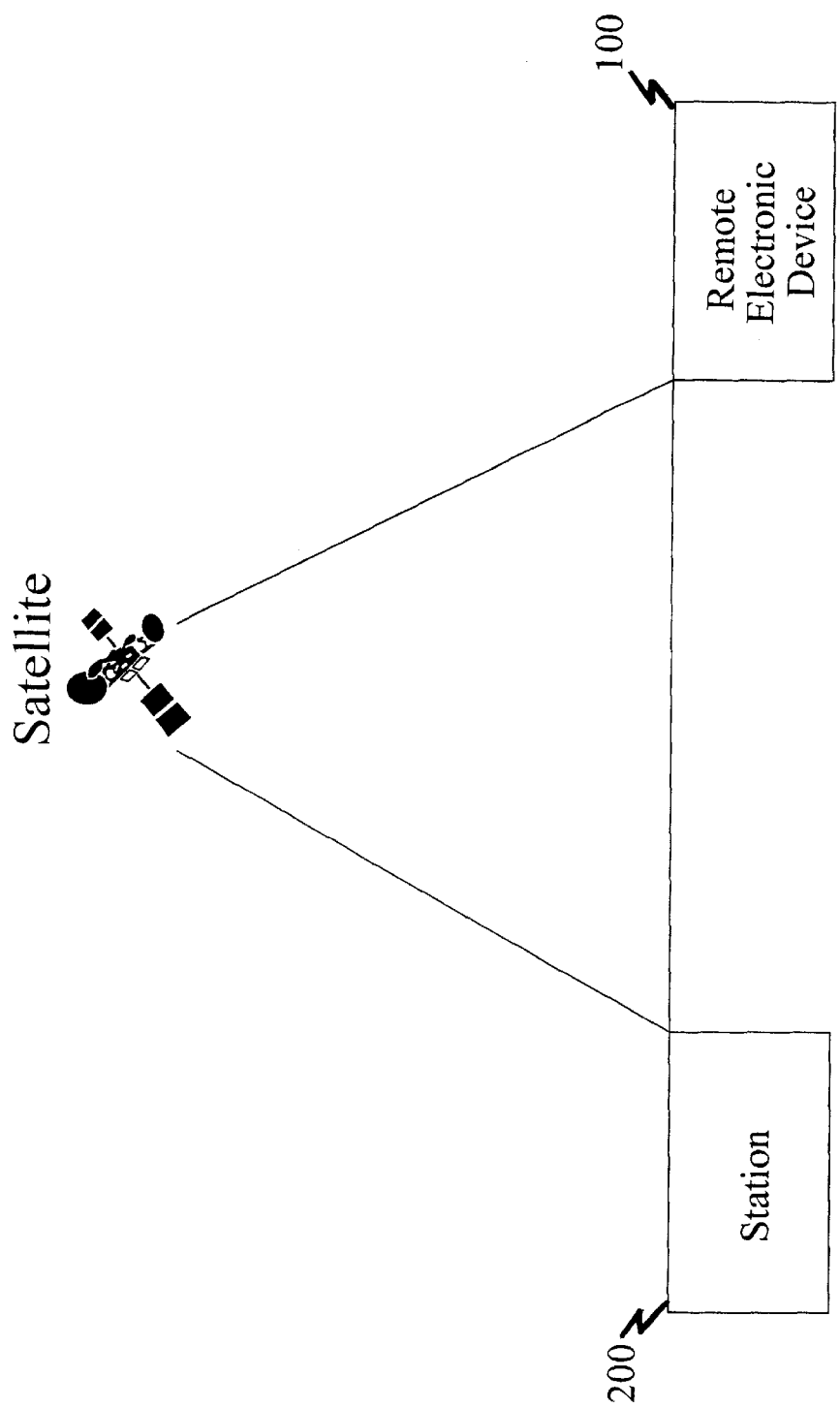
FIG. 1A is a block diagram showing the components of a system for securing data stored in a remote electronic device, in accordance with a first embodiment of the present invention.
Figure 1B:
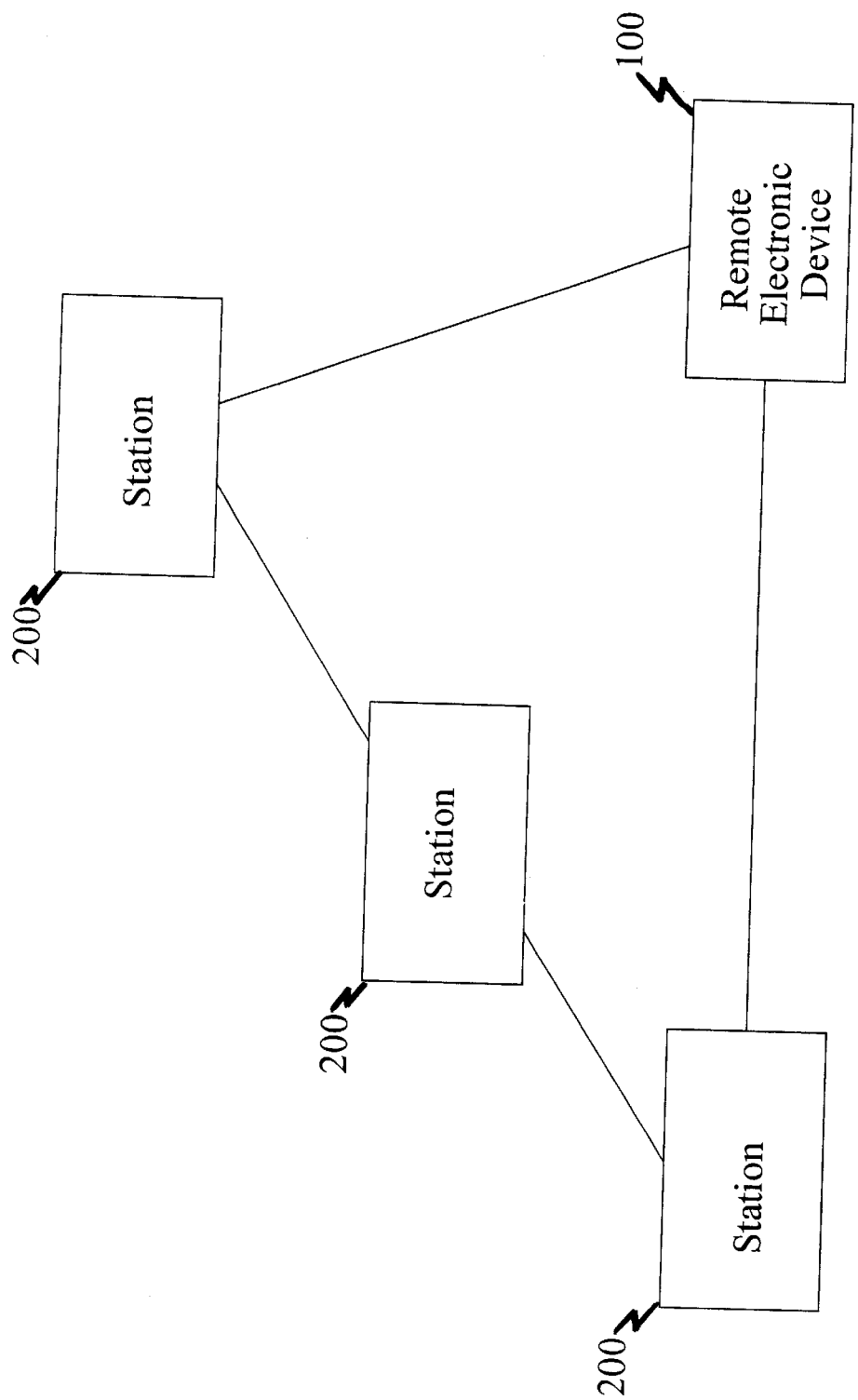
FIG. 1B is a block diagram of an alternate system for securing data stored in a remote electronic device, in accordance with an alternative preferred embodiment of the present invention.

Referring now to FIG. 1A, there is shown a block diagram showing the basic components of a system for securing data in a remote electronic device in accordance with the present invention. The system includes a remote electronic device 100, which is formed for example, from a wireless telephone, laptop computer, palm pilots, music/video players, cameras, pagers, or the like. It will be understood by those skilled in the art that any remote electronic device that stores information personal to a user may be adapted to function in accordance with the present invention. The system also includes a station or site 200, which is operated by a network service provider. The user of the remote electronic device is typically a subscriber of the network service provider, e.g., in cases where the remote electronic device includes a wireless modem, the network provider will correspond to the company that provides wireless service to the user of the device 100. In FIG. 1, the network service provider and the remote electronic device 100 communicate via a satellite link. This embodiment corresponds, for example, to wireless telephones that communicate via low-orbit earth satellites. In FIG. 1B, the network service provider and the remote electronic device 100 communicate via a ground-based wireless link such as an analog or digital wireless link.

Figure 2:
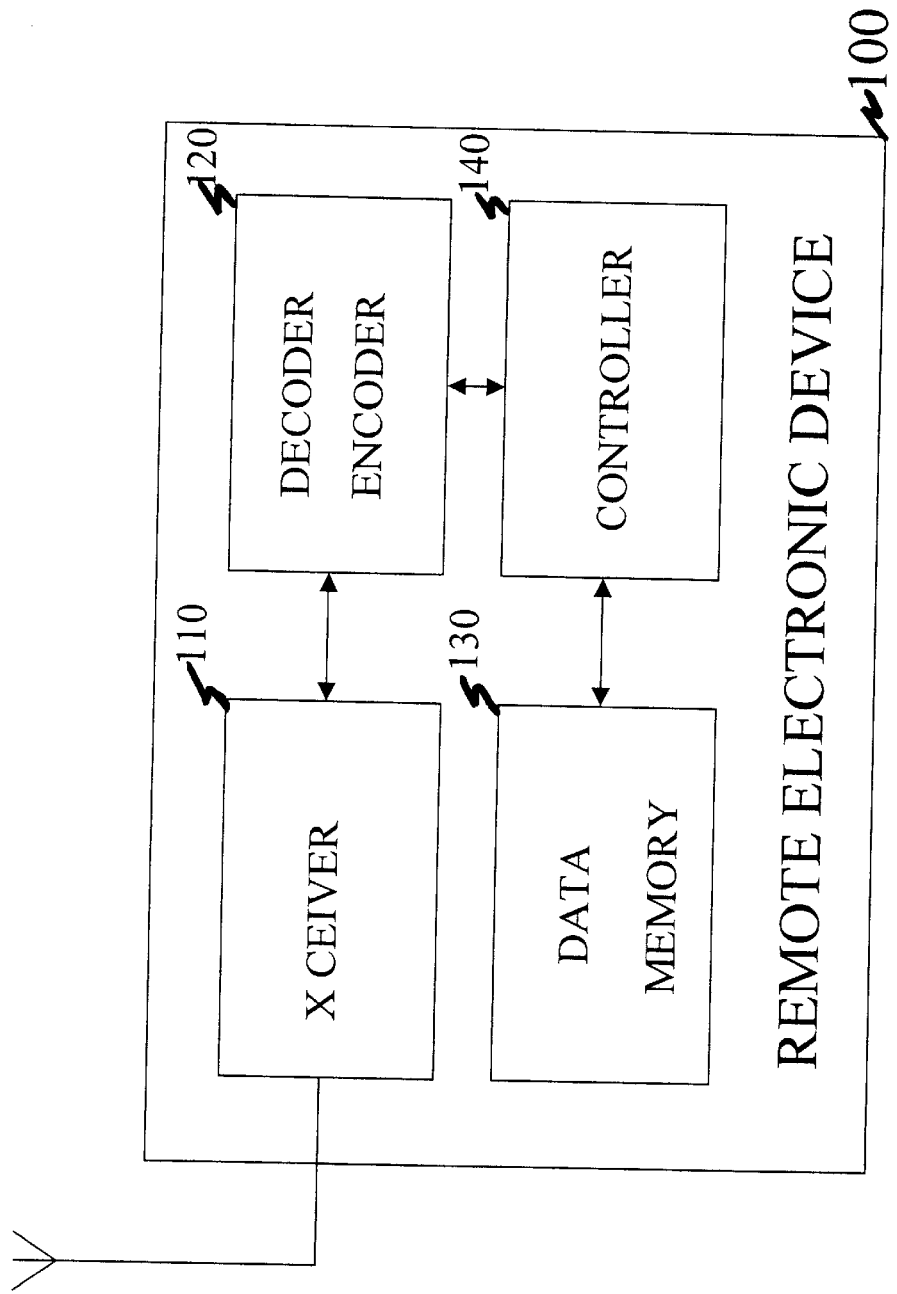
FIG. 2 is hardware block diagram showing the basic components of a remote electronic device that has been adapted to secure data stored in the device, in accordance with the present invention.

Referring now to FIG. 2, there is shown a block diagram of a remote electronic device 100, that has been adapted to secure data stored in the device in the case of loss or theft of the device, in accordance with the present invention. The device includes a memory 130, where information that is private, personal or confidential to the user of device 100 is stored. As set forth above, this information corresponds, for example: phone numbers and addresses, account or business information, passwords and alarm codes of the user, appointments or e-mail messages sent or received and/or confidential information/documents of the user/subscriber.

Device 100 also includes a transceiver 110 for sending and receiving signals from station 200. As set forth more fully below, transceiver 110 receives recovery signals from station 200 during operation of the present invention. After such recovery signals are received and decoded and provided to controller 140 in device 100, the controller then operates as set forth in FIG. 3 to safeguard the information stored in memory 130. In addition, in cases where the data recovery includes the downloading of data from device 100 to station 200, controller 140 operates to retrieve the data from memory 130 and, thereafter, the data is encoded and transmitted to station 200 using transceiver 110.

Figure 3:
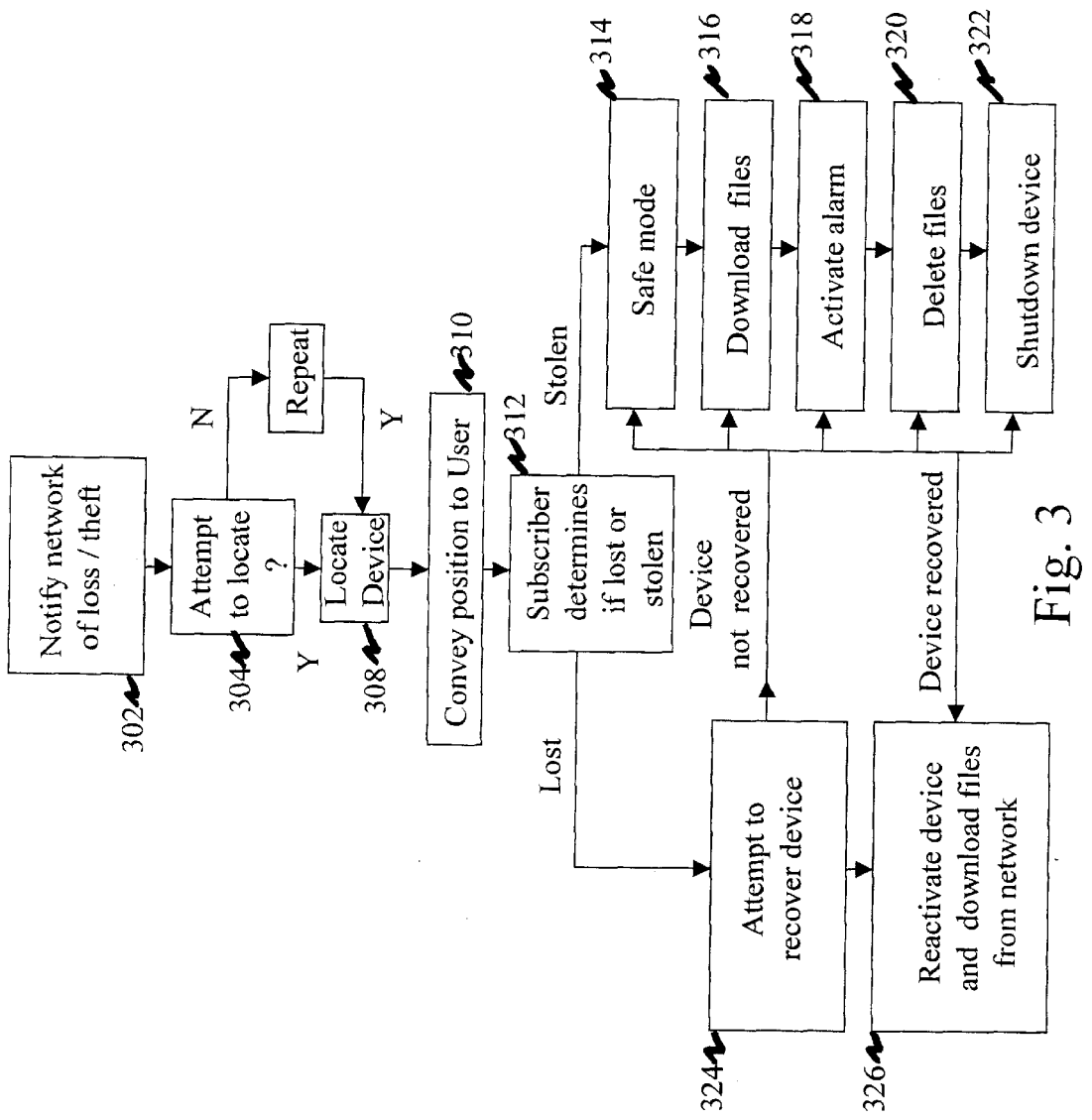
FIG. 3 is a process flow diagram showing the operation of a system for securing data stored in a remote electronic device, in accordance with the present invention.

Referring now to FIG. 3, there is shown a diagram illustrating the operation of a system for securing data stored in a remote device in accordance with the present invention. In step 302, a communication from a subscriber indicating loss of a remote electronic device 100 by the subscriber is received at a site 200 operated by a network provider. For example, the subscriber calls the service representative at site 200 and informs them of the loss of the subscriber's remote electronic device. Alternatively, the subscriber could provide this information to the network provider via e-mail or some other communication medium. In the preferred embodiment, the communication from the subscriber indicating loss of a remote electronic device 100 is made to the service representative at site 100 via telephone, and the steps shown in FIG. 3 are performed with the assistance of the network representative during a single communication, with the subscriber remaining on the line throughout the process.

Referring still to FIG. 3, in step 304, an attempt is made, from the site 200 operated by the network provider, to contact the remote electronic device 100 via a wireless link (or a satellite link). If the initial attempt to contact the remote electronic device 100 is unsuccessful, further attempts are then made at regular intervals (using, for example, a system-based timer at site 200) from the site 200 operated by the network provider to contact the remote electronic device 100 via the wireless link (or satellite link), until contact is made between the site 200 operated by the network provider and the remote electronic device. In step 308, a geographic location of the remote electronic device is determined. This determination is preferably made upon making first contact with the remote electronic device 100 by station 200. The geographic information can be determined from triangulation of signals received from the remote electronic device 100 or, alternatively, the geographic information may be determined at the remote electronic device 100 using, for example, a GPS receiver (not shown), and then downloaded to the site 200 of the network provider. In either case, in step 310, after the site 200 operated by the network provider determines the geographic location of the remote electronic device 100, information representing a geographic position of the remote electronic device 100 is conveyed from the site 200 operated by the network provider to the subscriber. In the preferred embodiment, this geographic information is simply conveyed by an operator at station 200 to the subscriber of device 100 during the communication described above.

Next, in step 312, the subscriber determines whether the device 100 is lost or stolen based on the conveyed geographic information and recent use of the device known to the subscriber. If the conveyed geographic information indicates that device 100 is, for example, in the subscriber's bedroom (perhaps in a drawer and therefore not found initially by the subscriber) or alternatively, at a location visited by the subscriber in the recent past (such as the restaurant visited recently), the subscriber can deduce that the device has simply been misplaced (or lost), rather than stolen. Alternatively, if the conveyed geographic and recent use information reflects a place that the subscriber does not recognize, the subscriber can deduce that the device has been stolen. The subscriber could also deduce that the device was stolen based on usage information indicating unauthorized usage of the device, such usage information being provided to the subscriber by the service representative during, for example, the communication discussed above. For purposes of this invention a device is considered "lost" if the subscriber desires to attempt to recover the device before a data recovery signal is sent to the device. Conversely, a device is considered "stolen" if the subscriber immediately wishes to have a data recovery signal sent to the device before attempting to recover the device. In step 312, the subscriber provides an indication as to whether the remote electronic device is either lost or stolen to the site operated by the network provider. Again, this information is preferably conveyed from the subscriber to the network provider during the ongoing communication described above.

In step 324, if the subscriber indicates that the remote electronic device 100 is lost, then an attempt to recover the remote electronic device is next made. For example, the user attempts to recover the device at its location, which was previously conveyed in step 310. If the recovery is not successful (for example, if the unit cannot be recovered even though its location is known), then at least one data recovery signal is sent from station 200 to the remote electronic device 100. The recovery signal is received by transceiver 110 and, after decoding, provided to controller 140. The recovery signal causes controller 140 to activate sate mode, i.e., disable further use and/or electronic access to such information stored on the remote electronic device (step 314), download files containing personal/confidential information of the subscriber to site 200 (step 316), activate an audible alarm signal on the remote electronic device (step 318), delete files in memory 140 containing personal/confidential information of the subscriber (step 320), and/or disable the keypad and further functioning of the device 100 (step 322). Each of the options referenced in the preceding sentence (steps 314, 316, 318, 320, 322) are preferably presented to the subscriber by an operator at site 200 during the ongoing communication described above, and the subscriber chooses at his/her discretion during the communication which of steps 314, 316, 318, 320, 322 should be initiated by the operator at site 200. In cases where the subscriber opts to place the remote electronic device in safe mode, download, or delete files from memory 140 (i.e., steps 314, 316, 320), the data recovery signal causes the remote electronic device 100 to download the file(s) to the site 200 of the network provider before deleting such file(s) from the remote electronic device. If, after steps 314–322, the device is successfully recovered, the device is reactivated by the network provider in step 326. As part of the reactivation, the device is placed in a normal operational mode and any deleted files are optionally reloaded onto the device by the network provider via a wireless link.

Alternatively, if in step 312, the subscriber indicates that the remote electronic device 100 is stolen, then the at least one data recovery signal is immediately transmitted to the remote electronic device 100 upon receipt of the indication from the subscriber that the remote electronic device is stolen, and steps 314, 316, 318, 320 and/or 322 are performed as described above.

In one embodiment, the alarm signal activated in step 318 can be terminated only upon receipt by the remote electronic device of, for example, a further recovery signal transmitted from the site 200 operated by the network provider. The alarm signal may optionally be a voice recording stating information relating to unauthorized possession of the remote electronic device 100, or an emergency or alarm-like tone.

Furthermore, it is to be understood that although the present invention has been described with reference to a preferred embodiment, various modifications, known to those skilled in the art, may be made to the structures and process steps presented herein without departing from the spirit and scope of the invention as set forth in the several claims appended hereto.

What is claimed is:

1. A method of protecting data in a remote electronic device serviced by a network provider and used by a subscriber of the network provider, comprising the steps of:

(a) receiving, at a site operated by the network provider, a communication from the subscriber indicating loss of the remote electronic device by the subscriber;

(b) attempting, from the site operated by the network provider, to contact the remote electronic device via a wireless link;

(c) repeating step (b) at regular intervals until contact is made between the site operated by the network provider, and the remote electronic device; and (d) after contact is made with the remote electronic device in step (b), transmitting at least one data recovery signal to the remote electronic device;

(e) after contact is made with the remote electronic device in step (b), conveying, from the site operated by the network provider, information representing a geographic position of the remote electronic device to the subscriber;

(f) receiving, at the site operated by the network provider and in response to the information representing the geographic position of the remote electronic device, an indication from the subscriber indicating whether the remote electronic device is either lost or stolen;

(g) if the subscriber indicates that the remote electronic device is stolen, then immediately transmitting the at least one data recovery signal to the remote electronic device upon receipt of the indication from the subscriber that the remote electronic device is stolen; and (h) if the subscriber indicates that the remote electronic device is lost, then attempting to recovery the remote electronic device prior to transmitting the at least one data recovery signal to the remote electronic device;

wherein the at least one data recovery signal disables normal operation of the remote electronic device and deletes, downloads or places in safe mode at least one file stored in the remote electronic device.

2. The method of claim 1, where step (g) further comprises reactivating normal service on the remote electronic device upon recovery of the device.

\* \* \* \* \*